(12) United States Patent
Ritz et al.

(10) Patent No.: US 8,181,727 B2
(45) Date of Patent: May 22, 2012

(54) APPARATUS FOR FEEDING COOLING AIR TO A RADIATOR OF A MOTOR VEHICLE

(75) Inventors: Thomas Ritz, Nufringen (DE); Patrik Gisch, Heimsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 373 days.

(21) Appl. No.: 12/477,174

(22) Filed: Jun. 3, 2009

(65) Prior Publication Data

US 2010/0071977 A1  Mar. 25, 2010

(30) Foreign Application Priority Data

Sep. 25, 2008  (DE) .......................... 10 2008 049 010

(51) Int. Cl.
*B60K 11/00* (2006.01)
(52) U.S. Cl. ...................................... 180/68.1; 180/68.6
(58) Field of Classification Search ................ 180/68.1, 180/68.3, 68.4, 68.6; 123/41.58, 41.04, 41.05, 123/27 R; 165/160, 42, 44
See application file for complete search history.

(56) References Cited

U.S. PATENT DOCUMENTS

| | | | | |
|---|---|---|---|---|
| 1,257,218 A | * | 2/1918 | Griswold | 123/41.58 |
| 2,248,544 A | * | 7/1941 | Maruhn | 123/27 R |
| 2,276,279 A | * | 3/1942 | Asklund | 180/68.1 |
| 2,413,770 A | * | 1/1947 | Knoy | 123/41.04 |
| 3,543,838 A | * | 12/1970 | White | 165/160 |
| 4,410,032 A | * | 10/1983 | Mori | 123/41.58 |
| 4,534,506 A | * | 8/1985 | Ishida et al. | 123/41.05 |
| 4,924,826 A | * | 5/1990 | Vinson | 123/41.05 |
| 5,732,666 A | * | 3/1998 | Lee | 123/41.05 |
| 6,142,108 A | * | 11/2000 | Blichmann | 123/41.05 |
| 6,854,544 B2 | * | 2/2005 | Vide | 180/68.6 |
| 7,498,926 B2 | * | 3/2009 | Browne et al. | 180/68.1 |
| 7,766,111 B2 | * | 8/2010 | Guilfoyle et al. | 180/68.1 |
| 7,992,664 B2 | * | 8/2011 | Kiener et al. | 180/68.1 |
| 2006/0060401 A1 | * | 3/2006 | Bole | 180/68.1 |

FOREIGN PATENT DOCUMENTS

| | | |
|---|---|---|
| DE | 814563 C | 9/1951 |
| DE | 10 2004 026 419 A1 | 12/2005 |

* cited by examiner

*Primary Examiner* — Hau Phan

(57) ABSTRACT

Inlet openings at the frontal region of a vehicle have actuable transversely oriented pivoting lamellae disposed behind them. The lamellae guide an air flow to a vehicle radiator in a targeted manner. The pivoting lamellae are connected to an actuating device with control linkages that are articulated to one another via deflection levers for an upper and a lower lamella unit. The upper pivoting lamellae are adjusted at an angle which is different than the lower pivoting lamellae. The upper pivoting lamellae can be set in each case as a unit jointly with the lower pivoting lamellae as a further unit.

9 Claims, 5 Drawing Sheets

US 8,181,727 B2

APPARATUS FOR FEEDING COOLING AIR TO A RADIATOR OF A MOTOR VEHICLE

CROSS-REFERENCE TO RELATED APPLICATION

This application claims the priority, under 35 U.S.C. §119, of German patent application DE 10 2008 049 010.5, filed Sep. 25, 2008; the prior application is herewith incorporated by reference in its entirety.

BACKGROUND OF THE INVENTION

Field of the Invention

The invention lies in the automotive field. More specifically, the invention relates to an apparatus for feeding cooling air to a vehicle radiator of a motor vehicle, through inlet openings that are provided in the forward region of the vehicle and behind which actuable transversely oriented pivoting lamellae are arranged, via which an air flow can be guided to the vehicle radiator in a targeted manner.

German published patent application DE 10 2004 026 419 A1 describes an apparatus for feeding cooling air to a vehicle radiator. That apparatus comprises actuable pivoting flaps which make it possible to adapt an air throughput by inlet openings which are provided in the frontal region of a motor vehicle, in such a way that a predefined inflow of cooling air can be guided to the vehicle radiator.

Furthermore, German patent DE 814 563 describes a shutter with flaps on the engine radiator of a motor vehicle. There, the shutter flaps comprise two groups with a common adjusting drive and the two shutter groups are connected to one another via a clutch and can assume an open and closed position.

SUMMARY OF THE INVENTION

It is accordingly an object of the invention to provide an apparatus for guiding cooling air to the radiator of a motor vehicle which overcomes the above-mentioned disadvantages of the heretofore-known devices and methods of this general type and which apparatus makes it possible to subject the entire end face of the vehicle radiator uniformly to a cooling air flow.

With the foregoing and other objects in view there is provided, in accordance with the invention, an apparatus for feeding cooling air to a vehicle radiator of a motor vehicle, the motor vehicle having a frontal region formed with an inlet opening and a vehicle radiator to be exposed to a cooling air flow, the apparatus comprising:

transversely oriented, actuable, pivoting lamellae disposed behind the inlet opening in the frontal region of the vehicle, the pivoting lamellae being configured to guide an air flow to the vehicle radiator in a targeted manner;

an actuating device connected to the pivoting lamellae, the actuating device including control linkages articulated to one another via deflection levers for an upper lamella unit and a lower lamella unit;

the pivoting lamellae of the upper lamella unit having a different alignment angle with respect to the vehicle radiator, at least in an open position thereof, than the pivoting lamellae of the lower lamella unit; and the pivoting lamellae of the upper and lower lamella units being mounted for actuation between an open position and a closed position.

The advantages which are mainly achieved by way of the invention comprise the fact that, in particular in the case of tight space conditions in front of the vehicle radiator, the air flow is also deflected by targeted air guidance into regions of the vehicle radiator which cannot otherwise be reached. This is achieved by virtue of the fact that pivoting lamellae are connected to an actuating device which comprises control linkages which are articulated to one another via deflection levers for an upper and a lower lamella device, and the pivoting lamellae of the upper lamella unit have a different orientation angle with respect to the vehicle radiator at least in the open position than the pivoting lamellae of a lower lamella unit, and the pivoting lamellae of the two lamella units can be actuated from the open position into a closed position and back.

According to the invention, the vehicle radiator is arranged in a receiving space of the vehicle body, which receiving space has a greater height than the air guide space which is arranged approximately centrally with respect to the receiving space and in which the pivoting lamellae of the two lamella units are arranged above one another, and, in an open position of the pivoting lamellae, the latter are at such a an orientation or guide angle that a cooling air flow can be fed directly to the entire end face of the vehicle radiator.

In particular, an optimum open position for the targeted feeding of cooling air is achieved if, in an open position, the pivoting lamellae of the upper lamella unit are all adjusted such that they are oriented at an identical angle in a horizontal or oblique plane with respect to the end face of the vehicle radiator, and the pivoting lamellae of the lower lamella unit are all set oriented at an identical angle in an obliquely downwardly extending plane, at an obtuse angle with respect to the end face of the vehicle radiator. According to the invention, said pivoting lamellae which can be actuated in this way of the two lamella units advantageously achieve a situation where, despite regions of the vehicle radiator which are situated outside the air guide space, feeding of the cooling air flow to the entire end face of the vehicle radiator is achieved, which feeding is targeted in an optimum manner.

In order to achieve an actuation of all the pivoting lamellae of the two lamella units, there is provision according to the invention, furthermore, for the pivoting lamellae to be held rotatably on a stationary frame carrier in each case via a first rotary journal on a bearing limb which projects from the end side of the pivoting lamellae, and for a further second rotary journal on the bearing limb of each pivoting lamella to be connected rotatably to the control linkage.

According to one embodiment of the invention, the two control linkages are arranged in each case vertically and are arranged at a spacing in front of the frame carrier, as viewed in relation to the driving direction of the vehicle, and the deflection levers which connect the two control linkages are connected to the upper control linkage and are oriented in a forwardly inclined manner from the lower control linkage, as viewed in relation to the driving direction. In particular, the upper control linkage is arranged offset to the front with respect to the lower control linkage, as viewed in relation to the driving direction, the rotary journals in the bearing limbs of the pivoting lamellae of the upper lamella unit being at a smaller spacing from one another than the rotary journals in the bearing limbs of the pivoting lamellae of the lower lamella unit.

In order to adjust the lamella units, there is provision according to the invention for an actuating motor to be arranged in the lower control linkage, which actuating motor is connected to rotary journals of a central pivoting lamella of the lower lamella unit, so as to rotate the latter.

There is provision according to one embodiment of the invention for the actuating motor to adjust the lower control linkage via rotary journals of the central pivoting lamella of the lower lamella unit, and the upper control linkage can be adjusted with the pivoting lamellae of the upper lamella unit back into an open position or into a closed position via the deflection levers which connect the two control linkages. As a result of this embodiment of the control linkages, the pivoting lamellae of the two lamella units are actuated in such a way, or have their orientation angles, i.e., guide angles or deflection angles, adjusted in such a way, that the cooling air flow to the vehicle radiator can be deflected in such a way that the cooling performance is increased. Therefore, in the case of an identical cooling requirement, the cooling module with controllably articulated pivoting lamellae can be of smaller configuration than in the case of loading with uncontrolled cooling air.

According to the invention, the pivoting lamellae are controlled as a function of the cooling water temperature or the climate control system, that is to say the pivoting lamellae are only open, for example, when the cooling water temperature exceeds a defined critical value or when the climate control system is in operation. Other parameters for actuating the pivoting lamellae for opening and closing are likewise possible.

Other features which are considered as characteristic for the invention are set forth in the appended claims.

Although the invention is illustrated and described herein as embodied in an apparatus for feeding colling air to a vehicle radiator of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
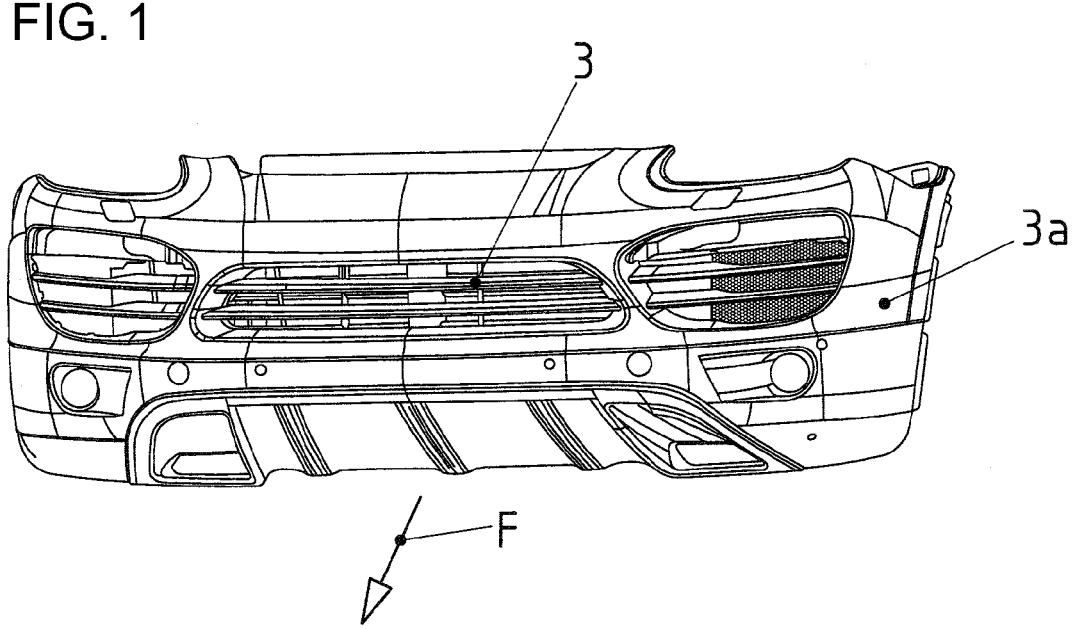
FIG. 1 is a perspective front view of a nose part of a motor vehicle with a central air inlet for feeding cooling air, with central air inlet lamella units arranged behind the air inlet.
Figure 2:
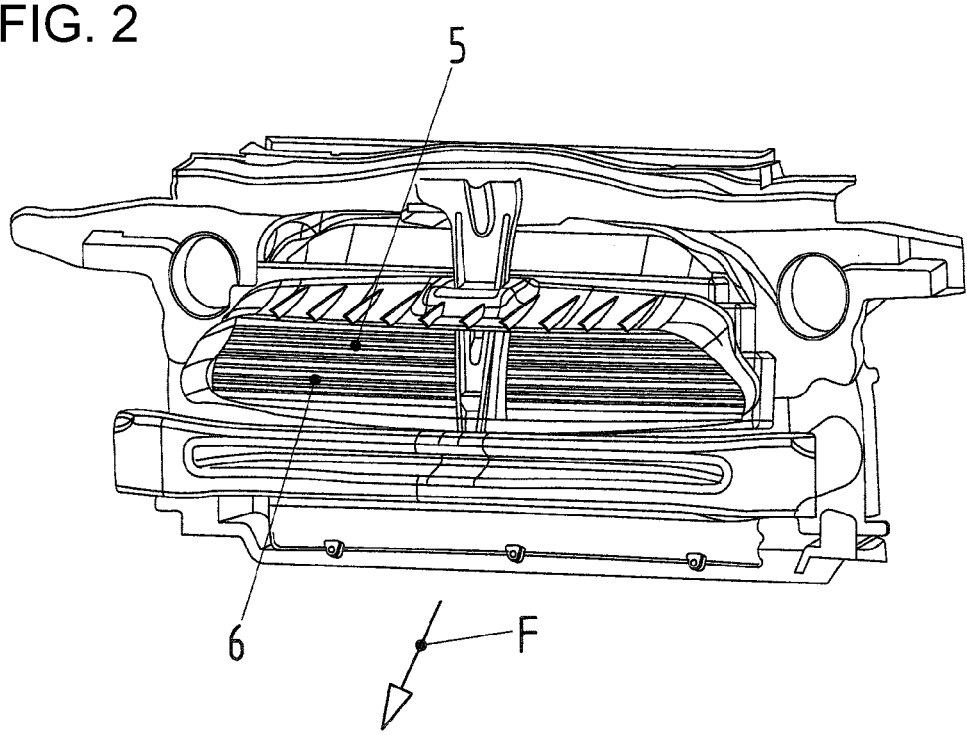
FIG. 2 is a perspective front view of an air feed space with the lamella units which are arranged in front of it.

Referring now to the figures of the drawing in detail and first, in particular, to FIG. 1 thereof, cooling air 1 is fed to a vehicle radiator 2 of a motor vehicle through an inlet opening 3, which is provided in the frontal region of the vehicle, in a nose part 3a of the vehicle. Pivoting lamellae L and L1 of lamella units 5 and 6 are arranged behind the inlet opening 3. The lamellae are oriented transversely in an air feed space 4.

Figure 4:
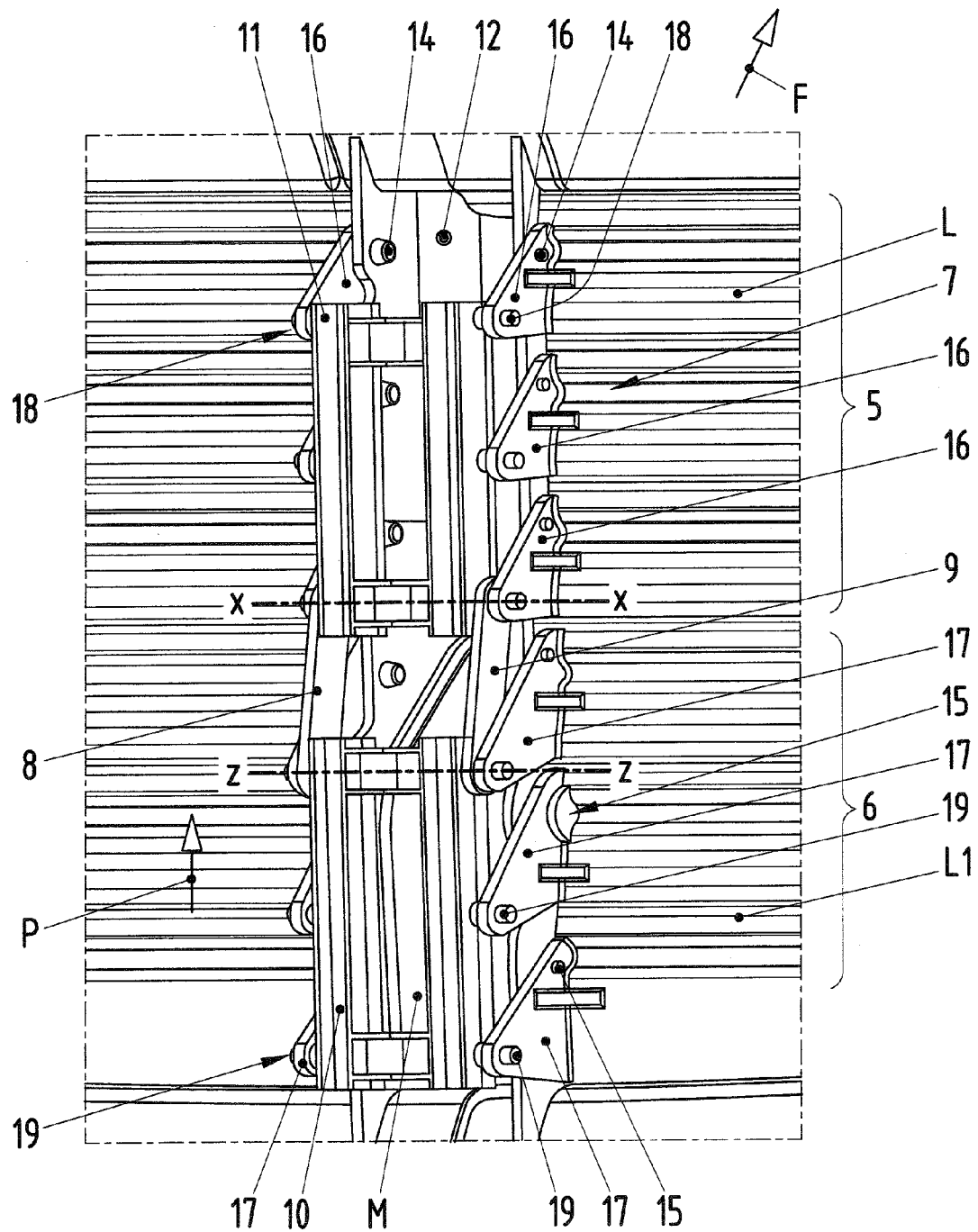
FIG. 4 is a perspective view of an actuating device of the lamella units with control linkages and connecting deflection levers.
Figure 5:
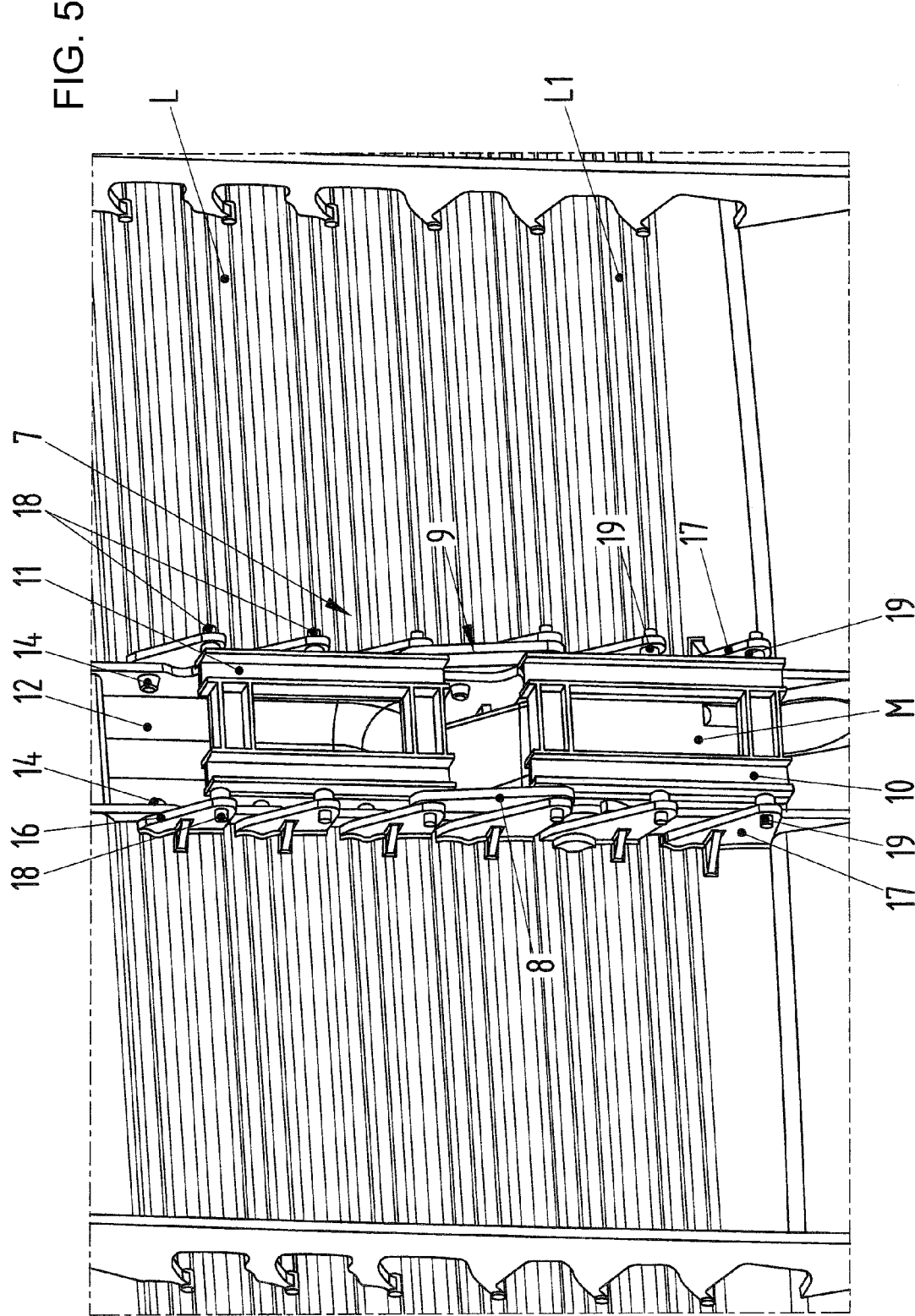
FIG. 5 is a further perspective view of the actuating device according to FIG. 4.
Figure 6:
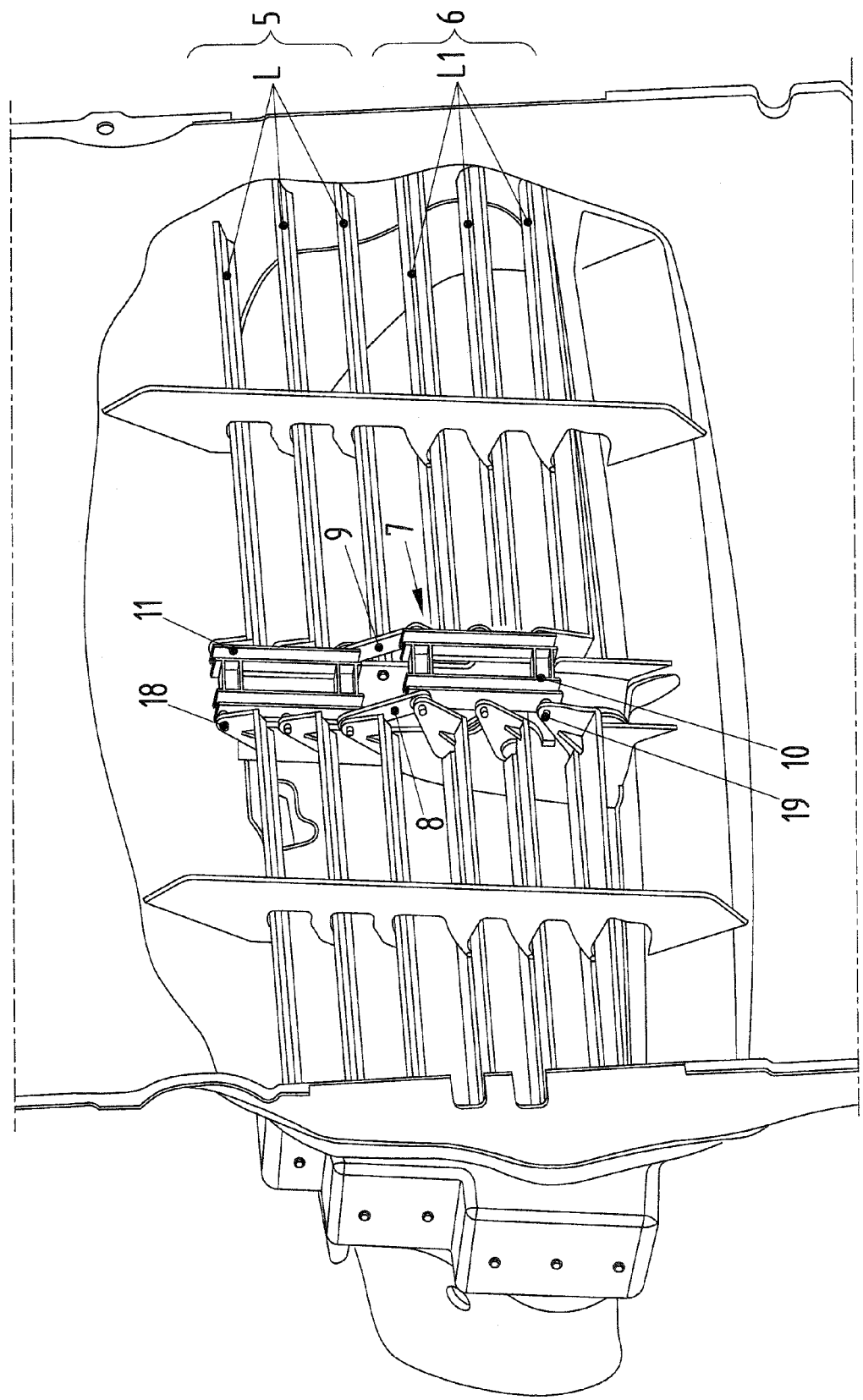
FIG. 6 is a perspective view of the lamella units in an open position with different orientation angles of the units of the pivoting lamellae.

The pivoting lamellae L and L1 are connected to an actuating device 7 (FIG. 4 et seq.) which comprises control linkages 10, 11 which are articulated to one another via deflection levers 8, 9. The pivoting lamellae L and L1 can be pivoted into an open and closed position and back via the actuating device 7 which is held on a stationary carrier 12 of the vehicle via the pivoting lamellae L and L1. An actuating motor M for actuating the pivoting lamellae L and L1 is connected to the actuating device 7.

Figure 3:
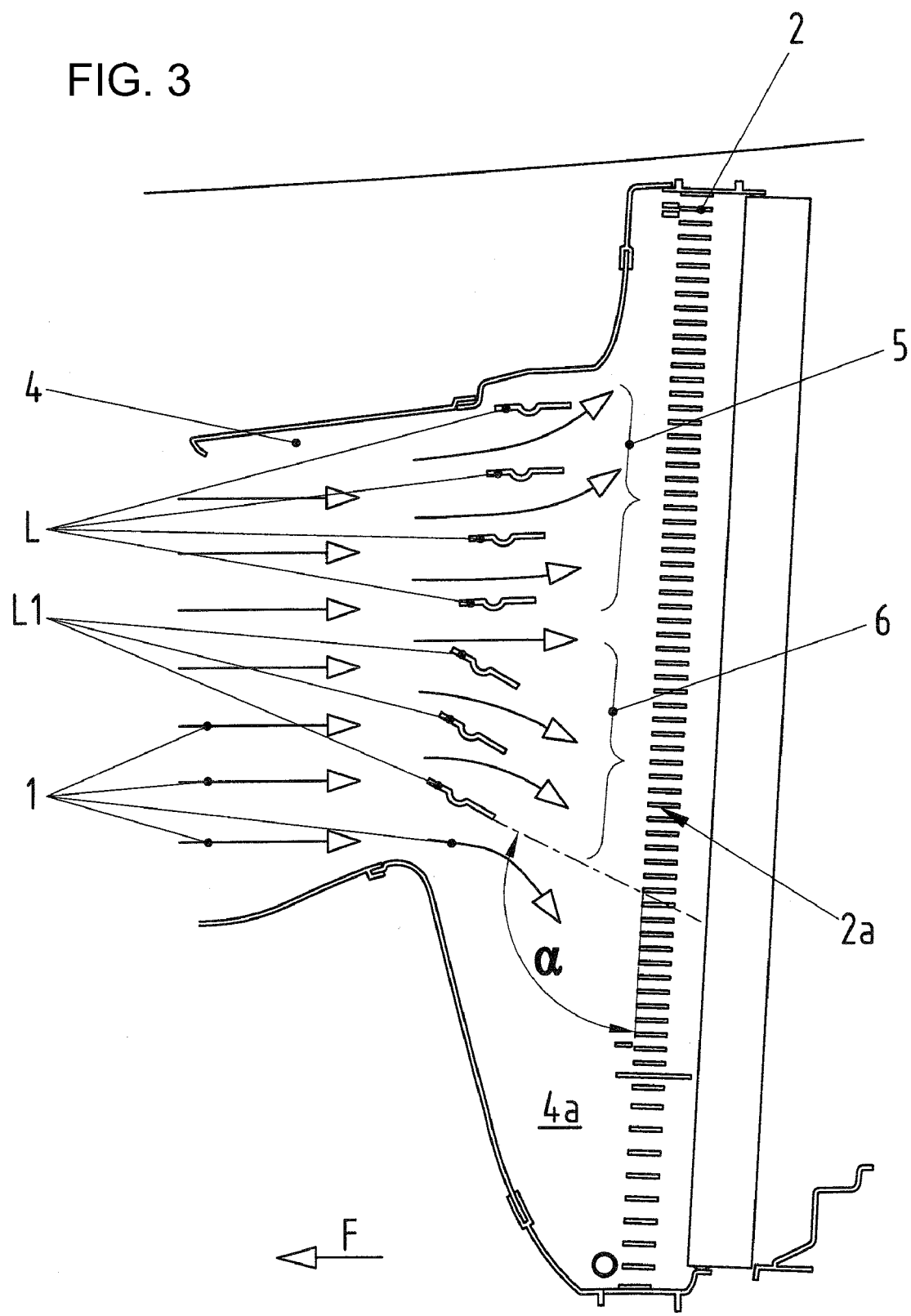
FIG. 3 is a schematic side view of a vertical section through the air guide space with lamella units and a vehicle radiator which is arranged in front in the receiving space.

As is shown diagrammatically in greater detail in a vertical section in FIG. 3, the height of the air guide space 4 is of smaller configuration than that of the receiving space 4a for the vehicle radiator 2, with the result that, if pivoting lamellae are not set, the upper and/or lower regions of the end face 2a of the vehicle radiator 2 are not exposed, or are exposed only slightly, to the cooling air flow 1. The orientation angle of the pivoting lamellae L and L1 of the two lamella units 5, 6 can be adapted to the conditions with regard to the installation space or the parameters such as the cooling performance.

In order to adjust the pivoting lamellae L and L1 of the two lamella units 5, 6, each pivoting lamella L and L1 is held rotatably on the stationary frame carrier 12 via in each case a first rotary journal 14 and 15 on a bearing limb 16 and 17 which is set to project laterally from the end side of the pivoting lamellae L and L1. A further second rotary journal 18, 19 on the bearing limbs 16, 17 of each pivoting lamella L and L1 is connected rotatably to the control linkage 11, 10.

In the structural embodiment according to the invention, the two control linkages 10 and 11 for the lamella units 6 and 5 are arranged at a spacing above one another, the two deflection levers 8 and 9 extending in an obliquely running manner from the lower control linkage 10 to the upper control linkage 11. In order that the two lamella units 5 and 6 of the pivoting lamellae L and L1 can have a different angular position with respect to one another, the spacings of the rotary journals 14 and 18 of the pivoting lamellae L and the spacings of the rotary journals 15 and 19 of the pivoting lamellae L with respect to one another are designed to be different, for example. Said spacings can be varied accordingly depending on the setting of the angular position of the pivoting lamellae L and L1 with respect to one another.

In the exemplary embodiment which is shown, the three upper pivoting lamellae L of the lamella unit 5 and the three lower pivoting lamellae L1 of the lamella unit 6 are set in alignment in each case at different angles relative to the radiator, and the units 5 and 6 can therefore be adjusted jointly via the control linkages. The three upper pivoting lamellae L and the three lower pivoting lamellae L1 are adjusted in each case jointly with the predefined angular position.

The two control linkages 10 and 11 of the actuating device 7 are connected adjustably in each case to the deflection levers 8, 9 via the rotary journals 19 of the lower lamella unit L1 and via the rotary journals 18 of the upper lamella unit L.

The actuating motor M which brings about the adjustment of the pivoting lamellae L and L1 is arranged in the lower actuating linkage 10 and is connected to the rotary journals 15 of the pivoting lamella L1 of the lamella unit 6. According to the embodiment, the central (that is to say, the second) pivoting lamella L1 of the lamella unit 6 is driven.

In order to actuate the pivoting lamellae L and L1, the central pivoting lamella is driven via the rotary journal 15. The lower control linkage 10 moves upward in the arrow direction P. The upper control linkage 11 is adjusted upward into a following movement via the deflection levers 8, 9 and therefore actuates the upper pivoting lamellae L of the lamella unit 5.

The invention claimed is:

1. An apparatus for feeding cooling air to a vehicle radiator of a motor vehicle, the motor vehicle having a frontal region formed with an inlet opening and the vehicle radiator to be exposed to a cooling air flow, the apparatus comprising:
   transversely oriented, actuable, pivoting lamellae disposed behind the inlet opening in the frontal region of the vehicle, said pivoting lamellae being configured to guide an air flow to the vehicle radiator in a targeted manner;
   an actuating device connected to said pivoting lamellae, said actuating device including control linkages articulated to one another via deflection levers for an upper lamella unit and a lower lamella unit;
   said pivoting lamellae of said upper lamella unit having a different alignment angle with respect to the vehicle radiator, at least in an open position thereof, than said pivoting lamellae of said lower lamella unit;
   said pivoting lamellae of said upper and lower lamella units being mounted for actuation between an open position and a closed position;
   a stationary frame carrier holding said pivoting lamellae;
   said pivoting lamellae including laterally projecting bearing limbs with first and second rotary journals, said pivoting lamellae being rotatably mounted to said stationary frame carrier via said first rotary journals and said pivoting lamellae are rotatably connected to said control linkages via said second rotary journals.

2. The apparatus according to claim 1, wherein the vehicle radiator is disposed in a receiving space having a greater height than an air feed space which is arranged centrally with respect to the receiving space, and wherein said pivoting lamellae of said upper and lower lamella units are disposed above one another in said air feed spaced and, in an open position thereof, said pivoting lamellae assume an alignment angle causing a cooling air flow to be fed directly to an entire end face of the vehicle radiator.

3. The apparatus according to claim 1, wherein, in the open position, said pivoting lamellae of said upper lamella unit are commonly oriented at a mutually identical angle in a horizontal or oblique plane with respect to an end face of the vehicle radiator, and said pivoting lamellae of said lower lamella unit are commonly oriented at a mutually identical angle in an obliquely downwardly extending plane, at an obtuse angle α with respect to the end face of the vehicle radiator.

4. The apparatus according to claim 1, wherein said control linkages are arranged vertically upright and at a spacing in front of said frame carrier, as viewed relative to a forward driving direction, and said deflection levers are connected to an upper said control linkage and oriented forwardly inclined from a lower said control linkage, as viewed relative to the forward driving direction.

5. The apparatus according to claim 1, wherein said control linkages are arranged vertically upright and at a spacing in front of said frame carrier holding said pivoting lamellae, as viewed relative to a forward driving direction, and said deflection levers are connected to an upper said control linkage and oriented forwardly inclined from a lower said control linkage, as viewed relative to the forward driving direction.

6. The apparatus according to claim 1, wherein said control linkages include a lower control linkage and an upper control linkage disposed forwardly with an offset relative to said lower control linkage, as viewed relative to the forward driving direction, and said rotary journals of said bearing limbs of said pivoting lamellae of said upper lamella unit are disposed at a smaller spacing from one another than said rotary journals of said bearing limbs of said pivoting lamellae of said lower lamella unit.

7. The apparatus according to claim 6, which further comprises an actuating motor disposed at said lower control linkage, said actuating motor being connected to a rotary journal of a central pivoting lamella of said lower lamella unit, and configured to adjust said pivoting lamellae of said first and second lamella units.

8. The apparatus according to claim 7, wherein said actuating motor effects a rotation of said lower lamella unit via the rotary journal of said central pivoting lamella of said lower lamella unit, and wherein said upper control linkage is adjustable with said pivoting lamellae of said upper lamella unit into an open or closed position and back via said deflection levers connecting said control linkages.

9. The apparatus according to claim 1, wherein said upper lamella unit has a lowermost, first lamella and said lower lamella unit has an uppermost lamella adjacent said first lamella of said upper lamella unit, and wherein said control linkages are connected to said projecting bearing limb on each side via said deflection levers by way of said rotary journals, one rotary journal of said upper control linkage forming a pivot axis for said first lamella of said upper lamella unit, and one of said rotary journals of said lower control linkage forming an opposite pivot axis for said uppermost pivoting lamella of said lower lamella unit.

\* \* \* \* \*